(12) United States Patent
Takami (10) Patent No.: US 11,370,236 B2
(45) Date of Patent: Jun. 28, 2022

(54) PRINTING APPARATUS, PRINTING METHOD AND A DETACHING ROLLER APPLY A TENSION TO BACKING SHEET FOR DETACHING PRINT LABELS FROM THE BACKING SHEET

(71) Applicant: SEIKO EPSON CORPORATION, Tokyo (JP)

(72) Inventor: Toru Takami, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 173 days.

(21) Appl. No.: 16/925,574

(22) Filed: Jul. 10, 2020

(65) Prior Publication Data

US 2021/0008908 A1     Jan. 14, 2021

(30) Foreign Application Priority Data

Jul. 11, 2019   (JP) .............................. JP2019-129022

(51) Int. Cl.
| | | |
|---|---|---|
| *B41J 13/00* | (2006.01) | |
| *B41J 3/407* | (2006.01) | |
| *B41J 11/06* | (2006.01) | |
| *B41J 11/00* | (2006.01) | |
| *G06K 15/12* | (2006.01) | |
| *G06K 15/02* | (2006.01) | |

(52) U.S. Cl.
CPC ......... *B41J 13/0009* (2013.01); *B41J 3/4075* (2013.01); *B41J 11/0085* (2013.01); *B41J 11/06* (2013.01); *G06K 15/024* (2013.01); *G06K 15/1223* (2013.01)

(58) Field of Classification Search
None
See application file for complete search history.

(56) References Cited

U.S. PATENT DOCUMENTS

| | | | | |
|---|---|---|---|---|
| 6,092,945 A | * | 7/2000 | Takami | .................. B41J 3/4075 |
| | | | | 400/613 |
| 2003/0001940 A1 | * | 1/2003 | Lo | .......................... B41J 15/044 |
| | | | | 347/105 |
| 2006/0008311 A1 | * | 1/2006 | Miyasaka | ............ B41J 11/0095 |
| | | | | 400/613 |

(Continued)

FOREIGN PATENT DOCUMENTS

JP          2019-043561          3/2019

*Primary Examiner* — Haris Sabah
(74) *Attorney, Agent, or Firm* — Workman Nydegger (57) ABSTRACT

A printing apparatus includes a transport roller applying a transport force to a label sheet having a backing sheet to which a label is attached, a printing head performing printing on the label sheet, a detaching roller configured to apply to the backing sheet a tension for detaching the label from the backing sheet at a detaching unit that detaches the label from the backing sheet and apply a transport force to the backing sheet from which the label was detached, and a control unit controlling the transport roller and the detaching roller, wherein the control unit controls driving of the transport roller and the detaching roller such that a front tension, which is a tension applied to the label sheet at the position of the transport roller, when the label sheet is back-fed to upstream in the transport path, is smaller than a front tension when the label sheet is front-fed to downstream.

11 Claims, 4 Drawing Sheets

(56) References Cited

U.S. PATENT DOCUMENTS

| | | | |
|---|---|---|---|
| 2006/0039737 A1* | 2/2006 | Takami | B41J 3/4075 400/613 |
| 2011/0013962 A1* | 1/2011 | Montagutelli | B41J 11/46 400/613 |
| 2015/0367624 A1* | 12/2015 | Tokuda | B32B 43/006 156/575 |
| 2019/0061388 A1 | 2/2019 | Kasai | |

* cited by examiner

PRINTING APPARATUS, PRINTING METHOD AND A DETACHING ROLLER APPLY A TENSION TO BACKING SHEET FOR DETACHING PRINT LABELS FROM THE BACKING SHEET

The present application is based on, and claims priority from JP Application Serial Number 2019-129022, filed Jul. 11, 2019, the disclosure of which is hereby incorporated by reference herein in its entirety.

BACKGROUND

1. Technical Field

The present disclosure relates to a printing apparatus and a printing method.

2. Related Art

Up to now, as described in JP-A-2019-43561, a printing apparatus is known as a label printer configured to transport a label sheet to which a label attached to a long-shaped backing sheet. In order to detach the printed label from the backing sheet, the printing apparatus includes a detaching unit configured to detach the label from the backing sheet by bending the backing sheet at an acute angle with respect to the label and pulling the label while applying a constant front tension to the backing sheet. Further, the detaching unit is arranged in front of the printing apparatus, away from a printing position where the printing head is arranged, to easily pick-up the label to be detached from the backing sheet.

However, in the printing apparatus described in JP-A-2019-43561, in order to transport the printed label to the detaching unit, when a unprinted region of the label sheet is to be printed on the next label, it is necessary to back-feed the position where the next label will be placed to the printing position, and transport the label sheet between a position past the printing position and the detaching position. When the back-feed is performed by a transport roller with the front tension applied to the backing sheet, depending on the specifications of the label sheet, slippage between the transport roller and the label sheet may occur, and the transport accuracy during the back-feed may deteriorate. As a result, the positional accuracy of the label at the printing position may deteriorate, and the printing quality of the label may deteriorate. In other words, the printing apparatus described in JP-A-2019-43561 has a problem in that the printing quality may deteriorate due to variations in the transport accuracy when back-feeding the label sheet.

SUMMARY

A printing apparatus according to the present disclosure includes a transport roller configured to apply a transport force to a label sheet having a backing sheet, to which a label is attached, in a transport path of the label sheet, a printing head configured to perform printing on the label sheet transported to a printing position in the transport path, a detaching unit arranged downstream of the printing position in the transport path and configured to detach the label from the backing sheet, a detaching roller configured to apply to the backing sheet a tension for detaching the label from the backing sheet at the detaching unit, and apply a transport force to the backing sheet from which the label was detached, and a control unit configured to control driving of the transport roller and the detaching roller, wherein the control unit controls driving of the transport roller and the detaching roller such that, a front tension, which is a tension applied to the label sheet at the position of the transport roller, when the label sheet is back-fed to upstream in the transport path, is smaller than a front tension when the label sheet is front-fed to downstream.

In the printing apparatus described above, the control unit may control driving of the transport roller and the detaching roller such that, when back-feeding the label sheet to upstream in the transport path, a transport amount by which the detaching roller back-feeds the backing sheet is greater than a transport amount by which the transport roller back-feeds the label sheet.

In the printing apparatus described above, when the label sheet is back-fed to upstream in the transport path, the control unit may start back-feed by the detaching roller prior to back-feeding by the transport roller.

In the printing apparatus described above, when back-feed of the label sheet is stopped, the control unit may stop the driving of the transport roller prior to stopping the driving of the detaching roller.

In the printing apparatus described above, when the label sheet is back-fed to upstream in the transport path, the control unit may start the driving of the detaching roller and the transport roller to implement back-feed after front-feeding the label sheet to downstream by a predetermined amount by the transport roller.

In the printing apparatus described above, the control unit may implement control such that when the label sheet is back-fed to upstream in the transport path, an acceleration when the detaching roller accelerates or decelerates the backing sheet and an acceleration when the transport roller accelerates or decelerates the label sheet are equal.

In the printing apparatus described above, after the back-feed is completed, the control unit may drive the detaching roller and front-feed the backing sheet by a predetermined amount.

In the printing apparatus described above, when the backing sheet is front-fed by a predetermined amount, a transport force of the detaching roller applied to the backing sheet may be less than a maximum static friction force of the label sheet with respect to the transport roller.

In the printing apparatus described above, when back-feed of the label sheet is stopped, the control unit may stop the driving of the detaching roller prior to stopping the driving of the transport roller.

The printing apparatus as described above may include a platen configured to support the label sheet at the printing position, and a suction unit, driving of which is controlled by the control unit and which is configured to suction the label sheet onto the platen, wherein when the label sheet is back-fed to upstream in the transport path, the control unit may control the suction unit to stop or weaken the suction.

A printing method according to the present disclosure is a printing method for performing printing by a printing apparatus including a transport roller configured to apply a transport force to a label sheet having a backing sheet, to which a label is attached, in a transport path of the label sheet, a printing head configured to perform printing on the label sheet transported to a printing position in the transport path, a detaching unit arranged downstream of the printing position in the transport path and configured to detach the label from the backing sheet, and a detaching roller configured to apply to the backing sheet a tension for detaching the label from the backing sheet at the detaching unit, and apply a transport force to the backing sheet from which the label was detached, the printing method includes a printing step for performing printing on the label sheet, a detaching step for detaching the label sheet from the backing sheet on which printing is completed, and a back-feeding step for controlling, while back-feeding the label sheet to upstream in the transport path, driving of the transport roller and the detaching roller such that a front tension, which is a tension applied to the label sheet at the position of the transport roller, is smaller than a front tension when front-feeding the label sheet to downstream.

DESCRIPTION OF EXEMPLARY EMBODIMENTS

1. Embodiment 1

Figure 1:
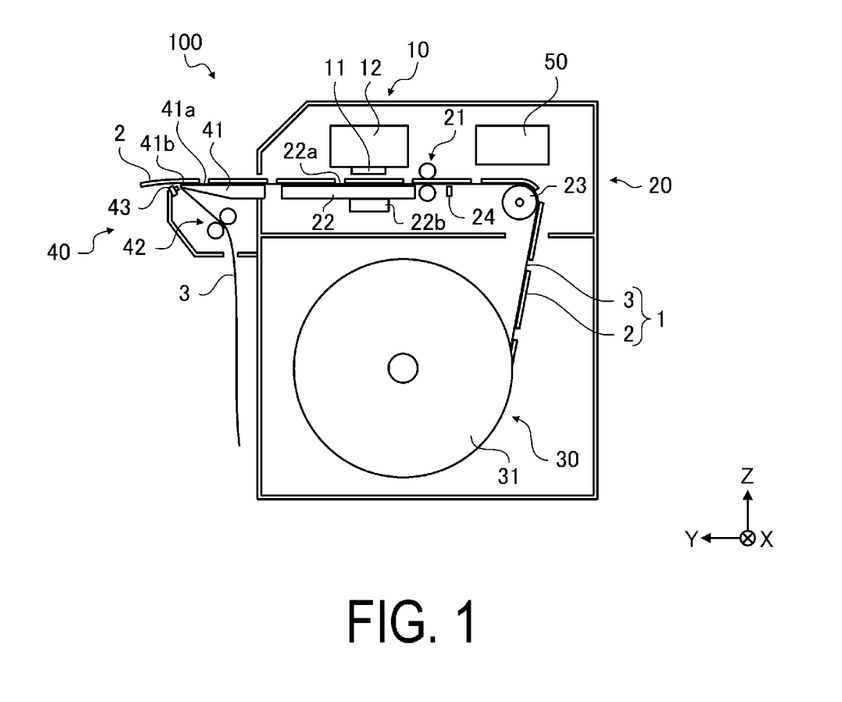
FIG. 1 is a front view schematically illustrating a configuration of a printing apparatus according to Embodiment 1.

FIG. 1 is a front view schematically illustrating a configuration of a printing apparatus 100 according to Embodiment 1. As for coordinates given in the drawings, it is assumed that a Z-axis direction is an up/down direction, a +Z direction is an upward direction, a Y-axis direction is a front/rear direction, a +Y direction is a frontward direction, an X-axis direction is a left/right direction, a +X direction is a leftward direction, and an X-Y plane is a horizontal plane.

The printing apparatus 100 is an ink-jet type label printer including a peeler and performing printing by discharging ink onto a label sheet 1 supplied in a roll state.

The printing apparatus 100 includes a printing unit 10, a transport unit 20, a supply unit 30, a detaching unit 40, a control unit 50, and the like.

The label sheet 1 is composed of a long backing sheet 3 to which a label 2 is attached. The label 2 is cut into a predetermined size, and is detachably attached at equal intervals in the longitudinal direction of the backing sheet 3. In addition, black marks are provided on a back surface of the backing sheet 3 at equal intervals corresponding to the interval between the adjacent labels 2. By optically reading the black mark, the printing apparatus 100 performs position control of the label 2 according to the printing position at which the printing unit 10 performs printing on the label sheet 1.

The printing unit 10 is a unit that prints on the label sheet 1 according to a control signal from the control unit 50 based on image information and character information to be printed. The printing unit 10 includes a printing head 11 discharging ink onto the surface of the label sheet 1, an ink supplier 12, and the like. The printing head 11 may be configured by a line head fixed and arranged in a width direction of the label sheet 1, or may be configured by a serial head mounted on a movable carriage and discharging ink while moving in the width direction of the label sheet 1.

The ink supplier 12 is a mechanism configured to supply ink to be discharged from the printing head 11, and includes an ink container configured to contain ink, an ink supply path from the ink container to the printing head 11, a pump configured to feed ink in the ink supply path, and the like. Note that, the ink container, the ink supply path, and the pump are not illustrated.

The transport unit 20 includes a transport roller 21, a platen 22, a feeding roller 23, a position detection sensor 24, and the like, and configures a transport path upstream and downstream of the printing position where the printing unit 10 performs printing on the label sheet 1.

The transport roller 21 includes a pair of a driving roller and a driven roller, the driving roller is rotated by a driving motor driven under control of the control unit 50 and transports the label sheet 1, and the driven roller holds the label sheet 1 between the driving roller and the driven roller and rotates with the rotation of the driving roller. The transport roller 21 is arranged upstream of the printing position in the transport path of the label sheet 1, and applies a transport force to the label sheet 1. By rotating the driving motor forward under the control of the control unit 50, the transport roller 21 performs a front-feed that transports the label sheet 1 in the downstream direction, and by reversing the driving motor, the transport roller 21 performs a back-feed that transports the label sheet 1 in the upstream direction. Further, the transport roller 21 includes a rotary encoder as a sensor configured to detect the rotation amount of the transport roller 21, that is, the transport amount of the label sheet 1.

Note that, the driving motor and the rotary encoder are not illustrated.

The platen 22 is a flat plate having a support surface 22a that faces the printing head 11 at the printing position and supports the label sheet 1 from below, and includes a suction fan 22b as a suction unit. A plurality of suction holes are formed in the support surface 22a. Each of the suction holes communicates with the suction fan 22b, by driving the suction fan 22b, air is suctioned from the suction hole and the label sheet 1 is suctioned onto the support surface 22a. Note that the suction holes are not illustrated.

The feeding roller 23 is a driven roller configuring a transport path that feeds the label sheet 1 supplied from the supply unit 30 to the printing position.

The position detection sensor 24 is a reflection-type photo sensor that detects the black mark arranged on the back surface of the backing sheet 3. The printing apparatus 100 uses the control unit 50 to detect that the black mark arranged on the back surface of the backing sheet 3 reaches the position of the position detection sensor 24, based on the detected value of the position detection sensor 24 or a change in the detected value. The position detection sensor 24 is arranged downstream of the feeding roller 23 and upstream of the transport roller 21 in the transport path of the label sheet 1. Further, a transmission-type sensor that detects between the label and the label may be arranged upstream of the transport roller 21 in the transport path of the label sheet 1.

The supply unit 30 is a unit configured to store the label sheet 1 before printing and feed the label sheet 1 to the transport unit 20. The supply unit 30 is located upstream of the printing position in the transport path, and includes a feeding reel 31 configured to load the label sheet 1 in a roll state. The feeding reel 31 may be configured such that a slight back tension is always applied to the label sheet 1 in the transport path between the feeding reel 31 and the transport roller 21 to prevent the label sheet from sagging, or the feeding reel 31 may be configured such to include a driving motor performing a rotational drive for assisting the movement of the label sheet 1 according to the front-feed or the back-feed by the transport roller 21.

The detaching unit 40 is a detaching mechanism configured to detach the backing sheet 3 from the label sheet 1 after printing, that is, to remove the label 2 from the backing sheet 3, and includes a detaching member 41, a detaching roller 42, a label sensor 43, and the like. The detaching unit 40 is located downstream of the printing position in the transport path of the label sheet 1, and is configured to protrude from the front surface of the printing apparatus 100.

The detaching member 41 is arranged in the transport path adjacent to the platen 22 in the downstream direction. The detaching member 41 includes a guide surface 41a configured to support the label sheet 1 fed from the printing position from below and located on an extension of the support surface 22a of the platen 22, and an acute detaching edge 41b formed at the downstream end of the guide surface 41a.

The detaching roller 42 includes a pair of a driving roller and a driven roller, the driving roller is rotated by a driving motor driven under control of the control unit 50 and transports the backing sheet 3, and the driven roller holds the backing sheet 3 between the driving roller and the driven roller and rotates with the rotation of the driving roller. The detaching roller 42 is arranged below the detaching member 41, and transports the backing sheet 3 in a direction bent at an acute angle by the detaching edge 41b of the detaching member 41. That is, the detaching roller 42 is capable of applying a tension to the backing sheet 3 to detach the backing sheet 3 from the label 2 at the detaching unit 40, and applying a transport force to the detached backing sheet 3. Further, the detaching roller 42 includes a rotary encoder as a sensor configured to detect the rotation amount of the detaching roller 42, that is, the transport amount of the backing sheet 3.

Note that, the driving motor and the rotary encoder are not illustrated.

The label sensor 43 is a reflection-type optical sensor that detects whether the label 2 is lifted up after the backing sheet 3 was detached by the detaching edge 41b, and is provided in the vicinity of the detaching edge 41b.

The control unit 50 includes a CPU, a user interface capable of exchanging information with a user of the printing apparatus 100, and a storage medium such as a RAM and a ROM, and performs centralized control of the entire printing apparatus 100. Specifically, the control unit 50 controls the printing unit 10, the transport unit 20, the supply unit 30, the detaching unit 40, and the like based on image data or printing specifications received from an external electronic device such as a personal computer, and forms a desired printed image in the label sheet 1 to create the label 2 as a printed matter. Hear, CPU means Central Processing Unit, RAM means Random Access Memory, and ROM means Read Only Memory.

When starting printing, first, the user of the printing apparatus 100 sets the label sheet 1 in a roll state in the supply unit 30, and a leading portion of the backing sheet 3 passes along the transport path in an order of the feeding roller 23, the transport roller 21, the platen 22, the detaching member 41, and the detaching roller 42.

Next, when the user specifies the printed image or the character information to be printed, and starts printing, the control unit 50 controls the transport roller 21 and the detaching roller 42 based on the black mark detection information of the position detection sensor 24, and transports the label 2 to the printing position. The printing unit 10 performs printing on the label 2 at the printing position under control of the control unit 50 as a printing process.

When printing is complete on one label 2, the control unit 50 controls the transport roller 21 and the detaching roller 42, and transports the printed label 2 to the detaching unit 40.

The backing sheet 3 of the label sheet 1 transported on the guide surface 41a of the detaching member 41 is bent at the detaching edge 41b and pulled downward by the detaching roller 42. Due to the pulling force of the detaching roller 42, that is, the tension applied to the backing sheet 3, the backing sheet 3 is detached from the label 2 at the detaching edge 41b, and the label 2 is lifted from the backing sheet 3. At a transport position before the lifted and detached label 2 is completely separated from the backing sheet 3, the control unit 50 controls the transport roller 21 and the detaching roller 42 to stop transporting the label sheet 1, and ends the detaching process. The label sensor 43 detects the label 2 in a state in which it is lifted and detached from the backing sheet 3.

When the user picks up the detached label 2 from the backing sheet 3, the label sensor 43 detects that the label 2 was removed. When receiving this detection signal, the control unit 50 controls the transport roller 21 and the detaching roller 42 to back-feed the label sheet 1 and move an unprinted next label 2 to the printing position, and the printing apparatus 100 proceeds to the standby mode for waiting for the next printing instruction.

Note that, the timing to back-feed the label sheet 1 may be the timing at which the user inputs a print start instruction for the next label 2 in a state where the label sensor 43 detects that the label 2 was removed.

In order to maintain print quality in such a series of label printing, it is necessary to maintain the transport accuracy of the label sheet 1 to be transported to the printing position at a high level. However, in a state where the detaching roller applies the tension for detaching the backing sheet 3, when the transport roller 21 is reversely rotated to back-feed the label sheet 1, slipping may occur between the transport roller 21 and the label sheet 1, and the transport accuracy during the back-feeding may deteriorate. In contrast, in the present embodiment, the variations in the transport accuracy when the label sheet 1 is back-fed from the detaching unit 40 can be suppressed.

Specifically, the control unit 50 controls driving of the transport roller 21 and the detaching roller 42 such that, when back-feeding the label sheet 1 to upstream in the transport path, a front tension, which is the tension applied to the label sheet 1 at the position of the transport roller 21, is smaller than a front tension when front-feeding the label sheet 1 to downstream.

In addition, when viewed as a printing method for performing printing by the printing apparatus 100, the printing method according to the present embodiment includes a printing step for performing printing on the label sheet 1, a detaching step for detaching the backing sheet 3 from the printed label 2, and a back-feeding step for controlling driving of the transport roller 21 and the detaching roller 42 to back-feed the label sheet 1 to upstream in the transport path such that, the front tension, which is the tension applied to the label sheet 1 at the position of the transport roller 21, is smaller than the front tension when front-feeding the label sheet 1 to downstream.

Specific examples of the back-feeding step will be described below.

1.1. Example 1

Figure 2:
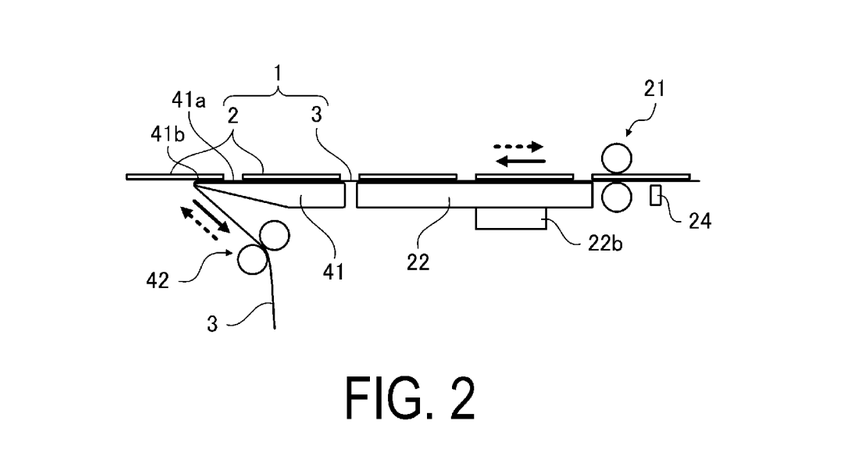
FIG. 2 is a schematic view illustrating a transport path including a transport roller and a detaching roller.

FIG. 2 is a schematic view illustrating a transport path including the transport roller 21 and the detaching roller 42. In FIG. 2, a direction of the solid arrow is a front-feed direction and a direction of the dashed arrow is a back-feed direction.

Figure 3:
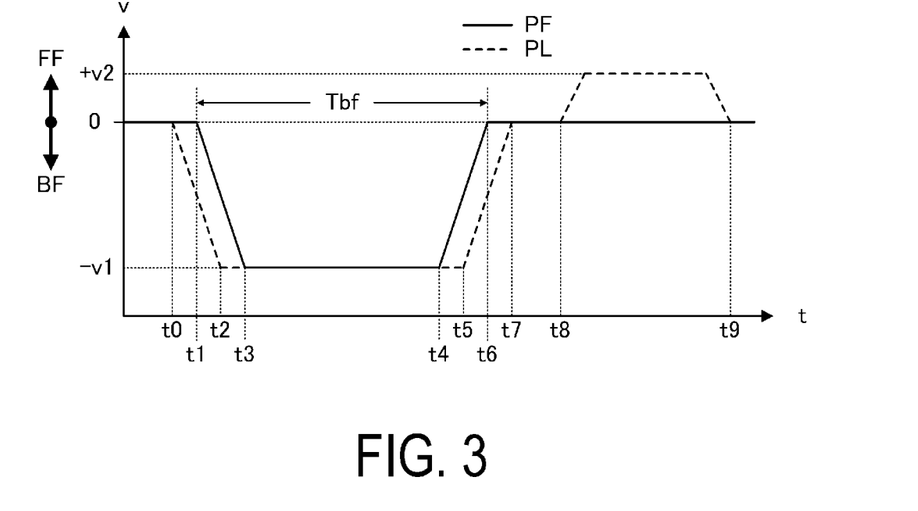
FIG. 3 is a graph illustrating specifications of transport speed control of a transport roller and a detaching roller by a control unit in Example 1.

FIG. 3 is a graph illustrating a transport speed v of either of the transport roller 21 and the detaching roller 42 when back-feeding the label sheet 1 in Example 1. That is, FIG. 3 illustrates the specification of transport speed control of the transport roller 21 and the detaching roller 42 by the control unit 50. As illustrated in FIG. 3, the solid line PF indicates the transport speed of the label sheet 1 transported by the transport roller 21, and the dashed line PL indicates the transport speed of the backing sheet 3 transported by the detaching roller 42. In the coordinate axis of transfer speed v, plus + means the front-feed speed, and minus – means the back-feed speed. The horizontal axis t indicates a time axis, and t0 to t9 aligned along the time axis t indicates the timing in chronological order.

Figure 4:
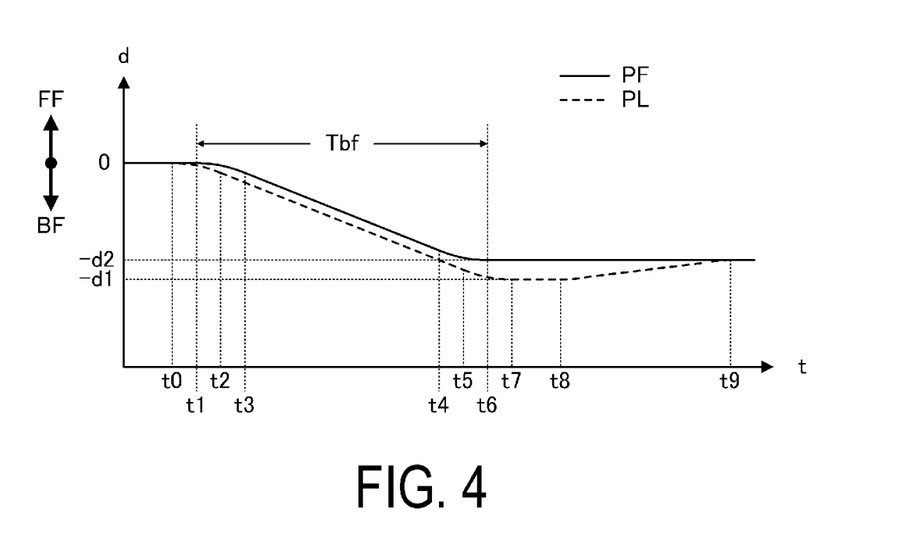
FIG. 4 is a graph illustrating the transport amount when back-feeding under the transport speed control in Example 1.

FIG. 4 is a graph illustrating a transport amount d when back-feeding under the transport speed control illustrated in FIG. 3. As illustrated in FIG. 4, the solid line PF indicates the transport amount d of the label sheet 1 by the transport roller 21, and the dashed line PL indicates the transport amount d of the backing sheet 3 by the detaching roller 42. In the coordinate axis of the transport amount d, plus + means the transport amount d in a front-feed direction, and minus – means the transport amount d in a back-feed direction.

In Embodiment 1, when back-feeding the label sheet 1 to upstream in the transport path, the control unit 50 starts back-feeding by the detaching roller 42 prior to the back-feeding by the transport roller 21.

The specific movement of the transport roller 21 and the detaching roller 42 under the control of the control unit 50 will be described below.

First, as illustrated in FIG. 3, at timing t0 the detaching roller 42 starts the back-feed of the backing sheet 3, subsequently, the transport roller 21 starts the back-feed of the label sheet 1 at timing t1. The detaching roller 42 continues accelerating until timing t2 at which the back-feed speed becomes −v1, and the transport roller 21 continues accelerating until timing t3 at which the back-feed speed becomes −v1. Here, the control unit 50 controls the acceleration when accelerating the backing sheet 3 by the detaching roller 42 and the acceleration when accelerating the label sheet 1 by the transport roller 21 to be equal.

Next, at a predetermined timing t4 based on the black mark detection information of the position detection sensor 24, the transport roller 21 starts decelerating, and subsequently, the detaching roller 42 starts decelerating at timing t5. At a predetermined timing t6 based on the black mark detection information of the position detection sensor 24, the transport roller 21 stops the back-feed, and then, the detaching roller 42 stops the back-feed at timing t7. That is, the control unit 50 stops the driving of the transport roller 21 prior to stopping the driving of the detaching roller 42.

Here, the predetermined timing t4 and timing t6 are timings set to control the driving of the transport roller 21 based on the black mark detection information of the position detection sensor 24, and are timings determined based on the design and evaluation of the transport specifications. Specifically, for example, the predetermined timing t6 is a timing at which the control unit 50 determines, based on the information of the rotary encoder included in the transport roller 21, that the next label 2, which has not been printed based on the black mark detection position, is transported by a predetermined transport amount d required to stop at the printing position.

In addition, when stopping the back-feed, the control unit 50 controls the acceleration when decelerating the backing sheet 3 by the detaching roller 42 and the acceleration when decelerating the label sheet 1 by the transport roller 21 to be equal.

As illustrated in FIG. 4, from timing t0 when the detaching roller 42 started the back-feed of the backing sheet 3 to timing t7 when the transport roller 21 and detaching roller 42 stop the back-feed, the back-feed amount of transporting the backing sheet 3 by the downstream detaching roller 42 is greater than the back-feed amount of transporting the label sheet 1 by the upstream conveying roller 21. That is, the control unit 50 controls the driving of the transport roller 21 and the detaching roller 42 such that the transport amount d by which the detaching roller 42 back-feeds the backing sheet 3 is greater than the transport amount d by which the transport roller 21 back-feeds the label sheet 1. Thus, in a back-feed period Tbf from timing t1 to timing t6 when the transport roller 21 back-feeds the label sheet 1, the tension applied to the backing sheet 3 between the detaching roller 42 and the transport roller 21, that is, the tension applied to the label sheet 1 is reduced, or the label sheet 1 sags.

Here, at timing t7 when the transport roller 21 and the detaching roller 42 stop the back-feed, a transport amount d1 by which the detaching roller 42 back-feeds the backing sheet 3 is greater than a transport amount d2 by which the transport roller 21 back-feeds the label sheet 1, thus, the label sheet 1 at the printing position may sag, which may affect the detaching of the label sheet 1. Thus, after the back-feed is completed, the control unit 50 drives the detaching roller 42 to front-feed the backing sheet 3 by a predetermined amount. Specifically, as illustrated in FIG. 3, the detaching roller 42 starts the front-feed of the backing sheet 3 at timing t8, and stops the front-feed at timing t9 when a predetermined amount of front-feed is completed. The predetermined amount is an appropriate transport amount d that sagging of the label sheet 1 is eliminated, and ideally, the transport amount d by which the detaching roller 42 back-feeds the backing sheet 3 is greater than the transport amount d by which the transport roller 21 back-feeds the label paper 1, that is, |d1−d2|.

Here, it is desirable that the transport amount d by which the detaching roller 42 front-feeds the backing sheet 3, including variations, is not greater than an ideal amount that sagging of the label sheet 1 is eliminated. However, when the transport amount d by which the detaching roller 42 front-feeds the backing sheet 3 is slightly excessive due to variation, to prevent the label sheet 1 from slipping with respect to the transport roller 21, the transport force of the detaching roller 42 applied to the backing sheet 3 when front-feeding the backing sheet 3 by a predetermined amount is set to be less than the maximum static friction force of the label sheet 1 with respect to the transport roller 21. Specifically, the control unit 50 performs torque control of the driving motor driving the detaching roller 42, and ensures that the transport force of the detaching roller 42 is not greater than the maximum static friction force of the label sheet 1 with respect to the transport roller 21 that is evaluated in advance.

Note that, by suctioning the label sheet 1 onto the platen 22, sagging of the label sheet 1 does not occur between the printing position and the position of the transport roller 21, when the label 2 is accurately located at the printing position at a position where the back-feed of the transport roller 21 is stopped, it is not necessary to perform the front-feed of the backing sheet 3 by the detaching roller 42 after timing t8. During the next printing, by causing the detaching roller 42 to perform the front-feed of the backing sheet 3 at a speed higher than the front-feed of the label sheet 1 by the transport roller 21, the sagging can be eliminated.

As described above, according to the present example, the following effects can be obtained.

The control unit 50 controls driving of the transport roller 21 and the detaching roller 42 such that, when back-feeding the label sheet 1 to upstream in the transport path, a front tension, which is the tension applied to the label sheet 1 at the position of the transport roller 21, is smaller than a front tension when front-feeding the label sheet 1 to downstream. The transport roller 21 performs the back-feed in a state where the front tension is further reduced, thus, slippage between the transport roller 21 and the label sheet 1 is suppressed in the back-feed. As a result, the positional accuracy of the label 2 at the printing position is prevented from deteriorating. That is, the deterioration in the printing quality due to variations in the transport accuracy when back-feeding the label sheet 1 can be suppressed.

Specifically, the control unit 50 may control driving of the transport roller 21 and the detaching roller 42 such that, when back-feeding the label sheet 1 to upstream in the transport path, the transport amount by which the detaching roller 42 back-feeds the backing sheet 3 is greater than the transport amount by which the transport roller 21 back-feeds the label sheet 1. In other words, by performing the back-feed such that the backing sheet 3 between the detaching roller 42 and the transport roller 21 sags, the front tension applied to the label sheet 1 at the position of the transport roller 21 is reduced. As a result, the slippage between the transport roller 21 and the label sheet 1 in the back-feed is suppressed, and the deterioration in the printing quality due to variations in the transport accuracy when back-feeding the label sheet 1 is suppressed.

Further, when back-feeding the label sheet 1 to upstream in the transport path, the control unit 50 starts back-feeding by the detaching roller 42 prior to the back-feeding by the transport roller 21. In other words, by performing the back-feed in a state where the backing sheet 3 between the detaching roller 42 and the transport roller 21 sags, the front tension applied to the label sheet 1 at the position of the transport roller 21 is reduced. As a result, the slippage between the transport roller 21 and the label sheet 1 in the back-feed is suppressed, and the deterioration in the printing quality due to variations in the transport accuracy when back-feeding the label sheet 1 is suppressed.

Further, when stopping back-feeding of the label sheet 1, the control unit 50 may stop the driving of the transport roller 21 prior to stopping the driving of the detaching roller 42. As a result, no further front tension is generated on the label sheet 1 at the position of the transport roller 21 when the back-feed stops. As a result, the positional accuracy of the label 2 at the printing position in the back-feed is prevented from deteriorating. That is, the deterioration in the printing quality due to variations in the transport accuracy when back-feeding the label sheet 1 can be suppressed.

Further, the control unit 50 may control such that, when back-feeding the label sheet 1 to upstream in the transport path, an acceleration when the detaching roller 42 accelerates or decelerates the backing sheet 3 is equal to an acceleration when the transport roller 21 accelerates or decelerates the label sheet 1. The acceleration of transport by the detaching roller 42 and the acceleration of transport by the transport roller 21 are equal, control by the control unit 50, such as control that prevents a change in the tension of the label sheet 1 due to transportation, can be made easier.

Further, after the back-feed is completed, that is, before the front-feed of the entire label sheet 1 is started, the control unit 50 drives the detaching roller 42 to front-feed the backing sheet 3 by a predetermined amount. By front-feeding the backing sheet 3 by the predetermined amount on the downstream detaching roller 42 side, the wrapped label sheet 1 sagged during the back-feed can be returned flat. As a result, an influence upon detaching the label sheet 1 due to the sagging of the label sheet 1 can be suppressed.

Further, the transport force applied by the detaching roller 42 during the front-feed for returning the sagged label sheet 1 during the back-feed is less than the maximum static friction force of the label sheet 1 with respect to the transport roller 21, thus, slipping does not occur between the transport roller 21 and the label sheet 1. As a result, the positional accuracy of the label 2 at the printing position is prevented from deteriorating.

1.2. Example 2

Figure 5:
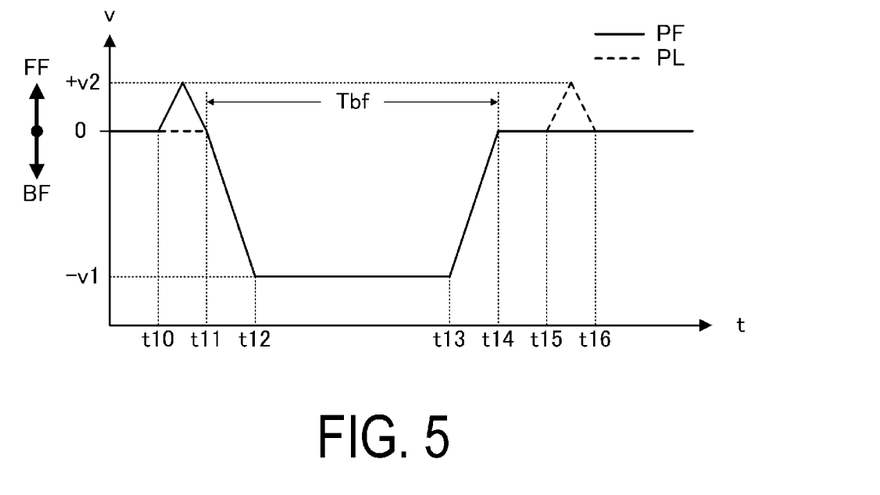
FIG. 5 is a graph illustrating specifications of transport speed control of a transport roller and a detaching roller by a control unit in Example 2.

FIG. 5 is a graph illustrating specifications of transport speed control of the transport roller 21 and the detaching roller 42 by the control unit 50 in Example 2.

Figure 6:
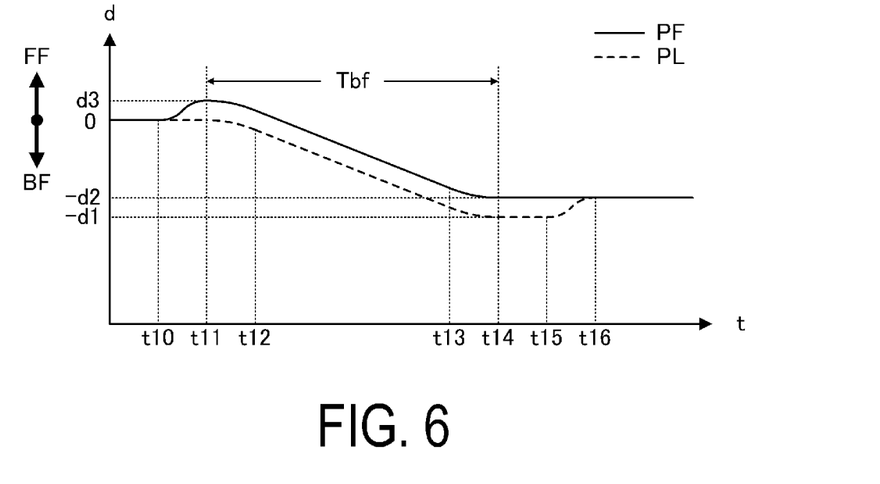
FIG. 6 is a graph illustrating the transport amount when back-feeding under the transport speed control in Example 2.

FIG. 6 is a graph illustrating the transport amount when back-feeding under the transport speed control illustrated in FIG. 5.

In the present embodiment, when back-feeding the label sheet 1 to upstream in the transport path, the control unit 50 may start the driving of the detaching roller 42 and the transport roller 21 after front-feeding the label sheet 1 to downstream by a predetermined amount by the transport roller 21.

Details will be described below.

First, from timing t0 to timing t11, acceleration and deceleration is performed by the transport roller 21 within a range of the transport speed +v2, and the label sheetlabel sheet 1 is front-fed to downstream by a transport amount d3 as the predetermined amount. By front-feeding the label sheet 1 to downstream by the transport amount d3, the tension applied to the backing sheet 3 between the detaching roller 42 and the transport roller 21, that is, the tension applied to the label sheet 1 is reduced, or the label sheet 1 sags.

Next, at timing t11 the detaching roller 42 starts the back-feed of the backing sheet 3, and at the same time, the transport roller 21 starts the back-feed of the label sheet 1. The detaching roller 42 and the transport roller 21 continues accelerating until timing t12 at which the back-feed speed becomes −v1. Here, the control unit 50 controls the acceleration when accelerating the backing sheet 3 by the detaching roller 42 and the acceleration when accelerating the label sheet 1 by the transport roller 21 to be equal.

Next, at a predetermined timing t13 based on the black mark detection information of the position detection sensor 24, the transport roller 21 starts decelerating, and at the same time, the detaching roller 42 starts decelerating. At a predetermined timing t14 based on the black mark detection information of the position sensor 24, the transport roller 21 stops the back-feed, and at the same time, the detaching roller 42 stops the back-feed.

Here, specifically, the predetermined timing t14 is a timing at which the control unit 50 determines, based on the information of the rotary encoder included in the transport roller 21, that the next label 2, which has not been printed based on the black mark detection position, is transported by a predetermined transport amount d required to stop at the printing position.

In the present example, as described above, the label sheet 1 is front-fed to downstream by the transport amount d3 before the back-feed, thus, in the back-feed period Tbf from timing t11 to timing t14, the transport amount d to be back-fed is increased by the transport amount d3 as compared to the case of Example 1.

In addition, when stopping the back-feed, the control unit 50 controls the acceleration when decelerating the backing sheet 3 by the detaching roller 42 and the acceleration when decelerating the label sheet 1 by the transport roller 21 to be equal. Thus, in a back-feed period Tbf when the transport roller 21 back-feeds the label sheet 1, the tension applied to the backing sheet 3 between the detaching roller 42 and the transport roller 21, that is, the tension applied to the label sheet 1, remains reduced, or the label sheet 1 remains sagged.

Next, after the back-feed is completed, the control unit 50 drives the detaching roller 42 to front-feed the backing sheet 3 by a predetermined amount. Specifically, as illustrated in FIG. 5, from timing t15 to timing t16, acceleration and deceleration is performed by the detaching roller 42 within a range of the transport speed +v2, and the backing sheet 3 is front-fed to downstream by the transport amount d3=|d2−d1| as the predetermined amount. At this time as well, the control unit 50 performs torque control of the driving motor driving the detaching roller 42, and ensures that the transport force of the detaching roller 42 is not greater than the maximum static friction force of the label sheet 1 with respect to the transport roller 21 that is evaluated in advance. Note that, by suctioning the label sheet 1 onto the platen 22, sagging of the label sheet 1 does not occur between the printing position and the position of the transport roller 21, when the label 2 is accurately located at the printing position at a position where the back-feed of the transport roller 21 is stopped, it is not necessary to perform the front-feed of the backing sheet 3 by the detaching roller 42 after timing t15. During the next printing, by causing the detaching roller 42 to perform the front-feed of the backing sheet 3 at a speed higher than the front-feed of the label sheet 1 by the transport roller 21, the sagging can be eliminated.

According to the present example, the following effects can be obtained.

When back-feeding the label sheet 1 to upstream in the transport path, the control unit 50 controls such that, after the transport roller 21 front-feeds the label sheet 1 to downstream by a predetermined amount, the detaching roller 42 back-feeds the backing sheet 3, and the transport roller 21 back-feeds the label sheet 1. In other words, by performing the back-feed in a state where the backing sheet 3 between the detaching roller 42 and the transport roller 21, or the label sheet 1 sags, the front tension applied to the label sheet 1 at the position of the transport roller 21 is reduced. As a result, the slippage between the transport roller 21 and the label sheet 1 in the back-feed is suppressed, and the deterioration in the printing quality due to variations in the transport accuracy when back-feeding the label sheet 1 is suppressed.

Note that, in the present example, from timing t11 to timing t14, the back-feed is performed at the same time. However, the back-feed by the detaching roller 42 may be started prior to the back-feed by the transport roller 21, similar to the case of Example 1. In addition, as in the case of Example 1, the back-feed by the detaching roller 42 may be stopped after the back-feed by the transport roller 21 is stopped. In these cases, the amount of sagging of the label sheet 1 becomes greater, it is necessary to increase the amount of the front-feed of the detaching roller 42 from timing t15 to timing t16.

1.3. Example 3

Figure 7:
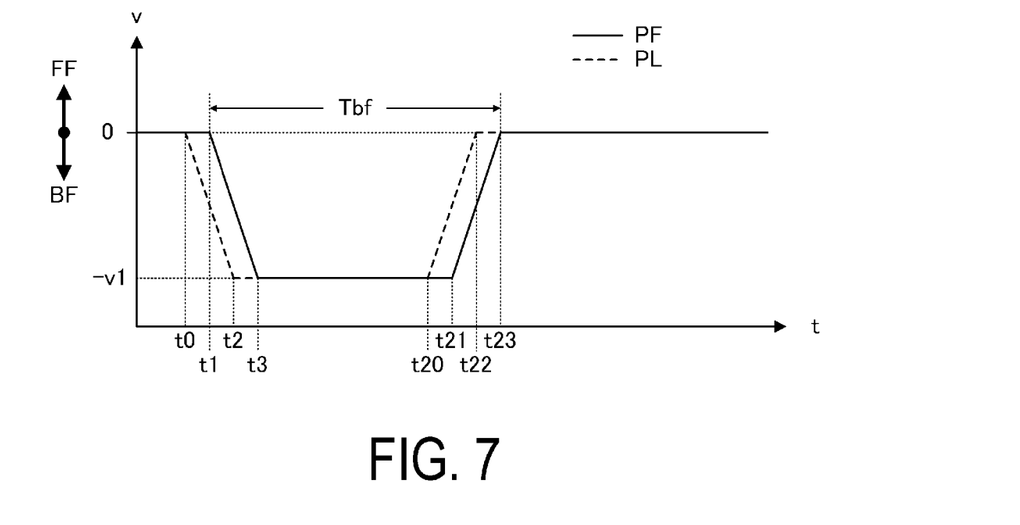
FIG. 7 is a graph illustrating specifications for transport speed control of a transport roller and a detaching roller by a control unit in Example 3.

FIG. 7 is a graph illustrating specifications of transport speed control of the transport roller 21 and the detaching roller 42 by the control unit 50 in Example 3.

Figure 8:
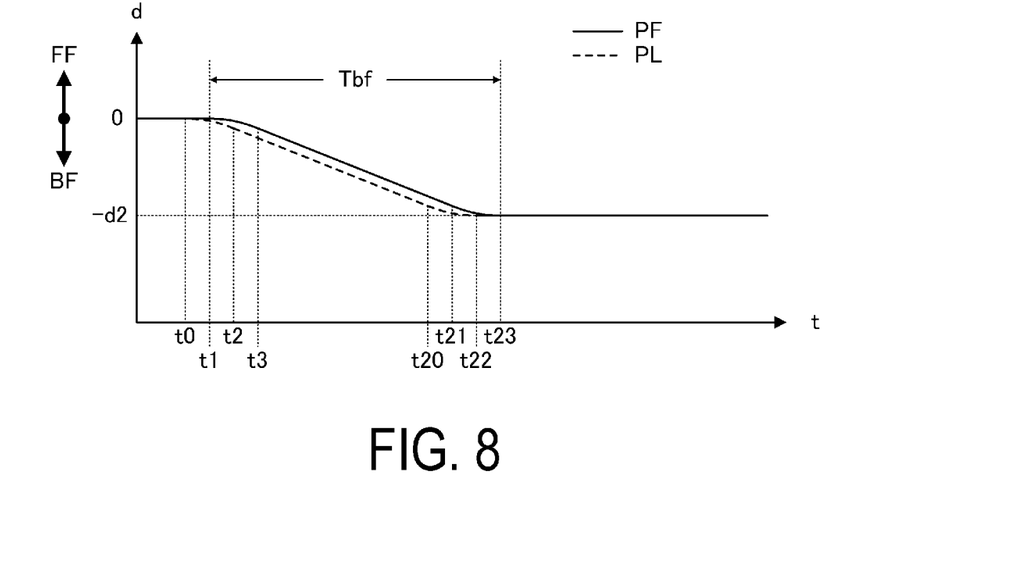
FIG. 8 is a graph illustrating the transport amount when back-feed under the transport speed control in Example 3.

FIG. 8 is a graph illustrating the transport amount when back-feeding under the transport speed control illustrated in FIG. 7.

In the present example, the control unit 50 performs the back-feed in the same manner as in Example 1, and when stopping the back-feed of the label sheet 1, stops the driving of the detaching roller 42 prior to stopping the driving of the transport roller 21.

Details will be described below.

The movement from timing t0 to timing t3 is the same as in Example 1.

Next, when stopping the back-feed, at a predetermined timing t20 based on the black mark detection information of the position detection sensor 24, the detaching roller 42 starts decelerating, and at a predetermined timing t21 based on the black mark detection information of the position detection sensor 24, the transport roller 21 starts decelerating. Then, at a predetermined timing t22 based on the black mark detection information of the position sensor 24, the detaching roller 42 stops the back-feed, and at a predetermined timing t23 based on the black mark detection information of the position sensor 24, the transport roller 21 stops the back-feed. That is, when stopping back-feeding of the label sheet 1, the control unit 50 stops the driving of the detaching roller 42 prior to stopping the driving of the transport roller 21.

Here, the predetermined timings t20 to t23 are timings set to control the driving of the transport roller 21 and the detaching roller 42 based on the black mark detection information of the position detection sensor 24, and are timings determined based on the design and evaluation of the transport specifications. In particular, the predetermined timing t23 is a timing at which the control unit 50 determines, based on the information of the rotary encoder included in the transport roller 21, that the next label 2, which has not been printed based on the black mark detection position, is transported by a predetermined transport amount d required to stop at the printing position.

According to the present example, when stopping back-feeding of the label sheet 1, the control unit 50 stops the driving of the detaching roller 42 prior to stopping the driving of the transport roller 21. By performing such control, the back-feed can be completed by returning the sagged label sheet 1 during the back-feed to an appropriate tension state. As a result, an influence upon detaching the label sheet 1 due to the sagging of the label sheet 1 can be suppressed.

2. Modified Example

A modified example will be described with reference to FIG. 2.

With respect to the printing apparatus 100 according to Embodiment 1, in the modified example, the control unit 50 is configured to control the driving of a suction fan 22*b* included in the platen 22. Specifically, when the label sheet 1 is back-fed to upstream in the transport path, the control unit 50 control the suction fan 22*b* to stop or weaken the suction.

According to the modified example, when the label sheet 1 is back-fed to upstream in the transport path, by controlling the suction fan 22*b* to stop or weaken the suction of the label sheet 1, a front tension generated by the label sheet 1 being suctioned by the platen 22 can be reduced. As a result, the front tension applied to the label sheet 1 at the position of the transport roller 21 when the transport roller 21 back-feeds the label sheet 1 is reduced, the slippage between the transport roller 21 and the label sheet 1 in the back-feed is suppressed, and the deterioration in the printing quality due to variations in the transport accuracy when back-feeding the label sheet 1 is suppressed.

Contents derived from the Embodiments will be described below.

A printing apparatus according to the present disclosure includes a transport roller configured to apply a transport force to a label sheet in which a label is attached to a backing sheet, in a transport path of the label sheet, a printing head configured to perform printing on the label sheet transported to a printing position in the transport path, a detaching unit arranged downstream of the printing position in the transport path and configured to detach the label from the backing sheet, a detaching roller capable of applying a tension to the backing sheet for detaching the label from the backing sheet at the detaching unit, and configured to apply a transport force to the backing sheet from which the label was detached, and a control unit configured to control driving of the transport roller and the detaching roller, wherein the control unit controls driving of the transport roller and the detaching roller such that, when the label sheet is back-fed to upstream in the transport path, a front tension, which is a tension applied to the label sheet at the position of the transport roller, is smaller than a front tension when the label sheet is front-fed to downstream.

According to this configuration, the control unit controls driving of the transport roller and the detaching roller such that, when back-feeding the label sheet to upstream in the transport path, the front tension applied to the label sheet at the position of the transport roller is smaller than the front tension when front-feeding the label sheet to downstream. The transport roller performs the back-feed in a state where the front tension is further reduced, thus, slippage between the transport roller and the label sheet 1 is suppressed in the back-feed. As a result, the positional accuracy of the label at the printing position is prevented from deteriorating. That is, the deterioration in the printing quality due to variations in the transport accuracy when back-feeding the label sheet can be suppressed.

In the printing apparatus described above, the control unit may control driving of the transport roller and the detaching roller such that, when back-feeding the label sheet to upstream in the transport path, a transport amount by which the detaching roller back-feeds the backing sheet is greater than the transport amount by which the transport roller back-feeds the label sheet.

According to this configuration, the control unit controls driving of the transport roller and the detaching roller such that, when back-feeding the label sheet to upstream in the transport path, the transport amount by which the detaching roller back-feeds the backing sheet is greater than the transport amount by which the transport roller back-feeds the label sheet. In other words, by performing the back-feed such that the backing sheet between the detaching roller and the transport roller sags, the front tension applied to the label sheet at the position of the transport roller is reduced. As a result, the slippage between the transport roller and the label sheet in the back-feed is suppressed, and the deterioration in the printing quality due to variations in the transport accuracy when back-feeding the label sheet is suppressed.

In the printing apparatus described above, when the label sheet is back-fed to upstream in the transport path, the control unit may start back-feeding by the detaching roller prior to back-feeding by the transport roller.

According to this configuration, when back-feeding the label sheet to the upstream side in the transport path, the control unit starts back-feeding by the detaching roller prior to the back-feeding by the transport roller. In other words, by performing the back-feed in a state where the backing sheet between the detaching roller and the transport roller sags, the front tension applied to the label sheet at the position of the transport roller is reduced. As a result, the slippage between the transport roller and the label sheet in the back-feed is suppressed, and the deterioration in the printing quality due to variations in the transport accuracy when back-feeding the label sheet is suppressed.

In the printing apparatus described above, when back-feeding of the label sheet is stopped, the control unit may stop the driving of the transport roller prior to stopping the driving of the detaching roller.

According to this configuration, when stopping back-feeding of the label sheet, the control unit stops the driving of the transport roller prior to stopping the driving of the detaching roller. Thus, no further front tension is generated on the label sheet at the position of the transport roller when the back-feed stops. As a result, the positional accuracy of the label at the printing position in the back-feed is prevented from deteriorating. That is, the deterioration in the printing quality due to variations in the transport accuracy when back-feeding the label sheet can be suppressed.

In the printing apparatus described above, when the label sheet is back-fed to upstream in the transport path, the control unit may start the driving of the detaching roller and the transport roller to implement back-feed after front-feeding the label sheet to downstream by a predetermined amount by the transport roller.

According to this configuration, when back-feeding the label sheet to upstream in the transport path, the control unit controls such that, after the transport roller front-feeds the label sheet to downstream by a predetermined amount, the detaching roller back-feeds the backing sheet, and the transport roller back-feeds the label sheet. In other words, by performing the back-feed in a state where the backing sheet between the detaching roller and the transport roller, or the label sheet sags, the front tension applied to the label sheet at the position of the transport roller is reduced. As a result, the slippage between the transport roller and the label sheet in the back-feed is suppressed, and the deterioration in the printing quality due to variations in the transport accuracy when back-feeding the label sheet is suppressed.

In the printing apparatus described above, the control unit may control such that when the label sheet is back-fed to upstream in the transport path, an acceleration when the detaching roller accelerates or decelerates the backing sheet and an acceleration when the transport roller accelerates or decelerates the label sheet are equal.

According to this configuration, the control unit controls such that, when back-feeding the label sheet to upstream in the transport path, an acceleration when the detaching roller accelerates or decelerates the backing sheet is equal to an acceleration when the transport roller accelerates or decelerates the label sheet. The acceleration of transport by the detaching roller and the acceleration of transport by the transport roller are equal, control by the control unit, such as control that prevents a change in the tension of the label sheet due to transportation, can be made easier.

In the printing apparatus described above, after the back-feed is completed, the control unit may drive the detaching roller and front-feed the backing sheet by a predetermined amount.

According to this configuration, after the back-feed is completed, that is, before the front-feed of the entire label sheet is started, the control unit drives the detaching roller to front-feed the backing sheet by a predetermined amount. By front-feeding the backing sheet by the predetermined amount on the downstream detaching roller side, the wrapped label sheet sagged during the back-feed can be returned flat. As a result, an influence upon detaching the label sheet due to the sagging of the label sheet can be suppressed.

In the printing apparatus described above, when the backing sheet is front-fed by a predetermined amount, a transport force of the detaching roller applied to the backing sheet may be less than a maximum static friction force of the label sheet with respect to the transport roller.

According to this configuration, the transport force applied by the detaching roller during the front-feed for returning the sagged label sheet during the back-feed is less than the maximum static friction force of the label sheet with respect to the transport roller, thus, slipping does not occur between the transport roller and the label sheet. As a result, the positional accuracy of the label at the printing position is prevented from deteriorating.

In the printing apparatus described above, when the back-feed of the label sheet is stopped, the control unit may stop the driving of the detaching roller prior to stopping the driving of the transport roller.

According to this configuration, when stopping the back-feeding of the label sheet, the control unit stops the driving of the detaching roller prior to stopping the driving of the transport roller. By performing such control, the back-feed can be completed by returning the sagged label sheet 1 during the back-feed to flat. As a result, an influence upon detaching the label sheet due to the sagging of the label sheet can be suppressed.

The printing apparatus as described above may further include a platen configured to support the label sheet at the printing position, and a suction unit, driving of which is controlled by the control unit and which is configured to suction the label sheet onto the platen, wherein the control unit may stop or weaken suction by the suction unit when the label sheet is back-fed to upstream in the transport path.

According to this configuration, the control unit controls the suction unit to stop or weaken the suction of the label sheet when back-feeding the label sheet to upstream in the transport path. That is, by reducing the front tension generated by the suction of the label sheet to the platen, the front tension applied to the label sheet at the position of the transport roller is reduced. As a result, the slippage between the transport roller and the label sheet in the back-feed is suppressed, and the deterioration in the printing quality due to variations in the transport accuracy when back-feeding the label sheet is suppressed.

A printing method according to the present disclosure is a printing method for performing printing by a printing apparatus including a transport roller configured to apply a transport force to a label sheet in which a label is attached to a backing sheet, in a transport path of the label sheet, a printing head configured to perform printing on the label sheet transported to a printing position in the transport path, a detaching unit arranged downstream of the printing position in the transport path and configured to detach the label from the backing sheet, and a detaching roller capable of applying a tension to the backing sheet to detach the label from the backing sheet at the detaching unit, and configured to apply a transport force to the backing sheet from which the label was detached, the printing method includes a printing step for performing printing on the label sheet, a detaching step for detaching the label from the backing sheet on which printing is completed, and a back-feeding step for controlling, while back-feeding the label sheet to upstream in the transport path, driving of the transport roller and the detaching roller such that a front tension, which is a tension applied to the label sheet at the position of the transport roller, is smaller than a front tension when front-feeding the label sheet to downstream.

According to this method, the back-feed of the label sheet is performed in a state where the front tension is further reduced, thus, slippage between the transport roller and the label sheet is suppressed in the back-feed. As a result, the positional accuracy of the label at the printing position is prevented from deteriorating. That is, the deterioration in the printing quality due to variations in the transport accuracy when back-feeding the label sheet can be suppressed.

What is claimed is:

1. A printing apparatus, comprising:
    a transport roller configured to apply a transport force to a label sheet having a backing sheet, to which a label is attached, in a transport path of the label sheet;
    a printing head configured to perform printing on the label sheet transported to a printing position in the transport path;
    a detaching unit arranged downstream of the printing position in the transport path and configured to detach the label from the backing sheet;
    a detaching roller configured to apply to the backing sheet a tension for detaching the label from the backing sheet at the detaching unit, and apply a transport force to the backing sheet from which the label was detached; and
    a control unit configured to control driving of the transport roller and the detaching roller, wherein
    the control unit controls driving of the transport roller and the detaching roller such that a front tension, which is a tension applied to the label sheet at the position of the transport roller, when the label sheet is back-fed to upstream in the transport path is smaller than a front tension when the label sheet is front-fed to downstream.

2. The printing apparatus according to claim 1, wherein the control unit controls driving of the transport roller and the detaching roller such that, when the label sheet is back-fed to upstream in the transport path, a transport amount by which the detaching roller back-feeds the backing sheet is greater than a transport amount by which the transport roller back-feeds the label sheet.

3. The printing apparatus according to claim 1, wherein when the label sheet is back-fed to upstream in the transport path, the control unit starts back-feed by the detaching roller prior to back-feeding by the transport roller.

4. The printing apparatus according to claim 3, wherein when the back-feed of the label sheet is stopped, the control unit stops the driving of the detaching roller prior to stopping the driving of the transport roller.

5. The printing apparatus according to claim 1, wherein when back-feed of the label sheet is stopped, the control unit stops the driving of the transport roller prior to stopping the driving of the detaching roller.

6. The printing apparatus according to claim 1, wherein when the label sheet is back-fed to upstream in the transport path, the control unit starts the driving of the detaching roller and the transport roller to implement back-feed after front-feeding the label sheet to downstream by a predetermined amount by the transport roller.

7. The printing apparatus according to claim 1, wherein the control unit implements control such that, when the label sheet is back-fed to upstream in the transport path, an acceleration when the detaching roller accelerates or decelerates the backing sheet and an acceleration when the transport roller accelerates or decelerates the label sheet are equal.

8. The printing apparatus according to claim 1, wherein after the back-feed is completed, the control unit drives the detaching roller and front-feeds the backing sheet by a predetermined amount.

9. The printing apparatus according to claim 8, wherein when the backing sheet is front-fed by a predetermined amount, a transport force of the detaching roller applied to the backing sheet is less than a maximum static friction force of the label sheet with respect to the transport roller.

10. The printing apparatus according to claim 1, comprising:
a platen configured to support the label sheet at the printing position; and
a suction unit, driving of which is controlled by the control unit, and which is configured to suction the label sheet onto the platen, wherein
when the label sheet is back-fed to upstream in the transport path, the control unit controls the suction unit to stop or weaken the suction.

11. A printing method for performing printing by a printing apparatus including: a transport roller configured to apply a transport force to a label sheet having a backing sheet, to which a label is attached, in a transport path of the label sheet; a printing head configured to perform printing on the label sheet transported to a printing position in the transport path; a detaching unit arranged downstream of the printing position in the transport path and configured to detach the label from the backing sheet; and a detaching roller configured to apply to the backing sheet a tension for detaching the label from the backing sheet at the detaching unit, and apply a transport force to the backing sheet from which the label was detached, the printing method comprising:
a printing step for performing printing on the label sheet;
a detaching step for detaching the label from the backing sheet on which printing is completed; and
a back-feeding step for controlling, while back-feeding the label sheet to upstream in the transport path, driving of the transport roller and the detaching roller such that a front tension, which is a tension applied to the label sheet at the position of the transport roller, is smaller than a front tension when the label sheet is front-fed to downstream.

* * * * *